US007681026B2

(12) United States Patent  
Martinez

(10) Patent No.: US 7,681,026 B2
(45) Date of Patent: *Mar. 16, 2010

(54) SYSTEM AND METHOD FOR REDUCING INSTABILITY IN AN INFORMATION HANDLING SYSTEM

(75) Inventor: Ricardo L. Martinez, Austin, TX (US)

(73) Assignee: Dell Products L.P., Round Rock, TX (US)

(*) Notice: Subject to any disclaimer, the term of this patent is extended or adjusted under 35 U.S.C. 154(b) by 234 days.

This patent is subject to a terminal disclaimer.

(21) Appl. No.: 11/834,116

(22) Filed: Aug. 6, 2007

(65) Prior Publication Data

US 2008/0040600 A1 Feb. 14, 2008

Related U.S. Application Data

(63) Continuation of application No. 10/427,238, filed on May 1, 2003, now Pat. No. 7,266,679.

(51) Int. Cl.
*G06F 9/00* (2006.01)
*G06F 15/177* (2006.01)
*G06F 1/24* (2006.01)

(52) U.S. Cl. .................. 713/1; 713/2; 713/100; 711/1

(58) Field of Classification Search ........... 713/1, 713/2, 100; 711/1
See application file for complete search history.

(56) References Cited

U.S. PATENT DOCUMENTS

| 5,544,333 | A | * | 8/1996 | Frazier et al. ............ 710/124 |
|---|---|---|---|---|
| 5,758,103 | A | | 5/1998 | Oh ........................... 710/302 |
| 5,815,705 | A | | 9/1998 | Slivka et al. ............... 713/2 |
| 5,822,547 | A | | 10/1998 | Boesch et al. ............ 710/302 |
| 5,892,929 | A | | 4/1999 | Welker ...................... 710/107 |
| 5,896,546 | A | | 4/1999 | Monahan et al. .......... 710/10 |
| 5,928,343 | A | | 7/1999 | Farmwald et al. ........ 710/104 |
| 6,038,624 | A | | 3/2000 | Chan et al. ................ 710/302 |
| 6,075,858 | A | | 6/2000 | Schwartzman ............ 705/52 |
| 6,189,050 | B1 | | 2/2001 | Sakarda ..................... 705/18 |
| 6,336,176 | B1 | | 1/2002 | Leyda et al. .............. 711/170 |
| 6,351,798 | B1 | | 2/2002 | Aono ......................... 712/11 |
| 6,366,965 | B1 | | 4/2002 | Binford et al. ............ 710/8 |
| 6,393,498 | B1 | | 5/2002 | Hou et al. ................... 710/1 |
| 6,493,822 | B1 | | 12/2002 | Rafanello .................... 713/1 |
| 6,532,526 | B2 | | 3/2003 | Nizar et al. ............... 711/170 |
| 6,754,750 | B2 | | 6/2004 | Davies ....................... 710/104 |
| 6,754,817 | B2 | | 6/2004 | Khatri et al. ............... 713/1 |
| 6,816,986 | B1 | | 11/2004 | Fanning ...................... 714/42 |

(Continued)

OTHER PUBLICATIONS

Intel Corporation, "Intel 82802AB/82802AC Firmware Hub (FWH) Datasheet" 53 Pages, Nov. 2000.

(Continued)

*Primary Examiner*—Ji H Bae
(74) *Attorney, Agent, or Firm*—Baker Botts L.L.P.

(57) ABSTRACT

A system and method for reducing instability in an information handling system are disclosed. A method includes detecting a configuration change of a first memory device. Next, the method determines a device identifier for a second memory device depending on the configuration change. The method proceeds to update a Configurable Identification (CID) register in the second memory device with the device identifier.

16 Claims, 2 Drawing Sheets

U.S. PATENT DOCUMENTS

| | | | | |
|---|---|---|---|---|
| 6,965,923 | B2 | 11/2005 | Norman et al. | 709/214 |
| 7,007,012 | B2 | 2/2006 | Morita et al. | 707/3 |
| 7,266,679 | B2 * | 9/2007 | Martinez | 713/100 |
| 2004/0064686 | A1 | 4/2004 | Miller et al. | 713/1 |

OTHER PUBLICATIONS

Intel Corporation, "Intel Low Pin Count (LPC) Interface Specification Revision 1.1" 50 Pages, Aug. 2002.

* cited by examiner

US 7,681,026 B2

SYSTEM AND METHOD FOR REDUCING INSTABILITY IN AN INFORMATION HANDLING SYSTEM

RELATED APPLICATION

This application is a Continuation of U.S. patent application Ser. No. 10/427,238 filed May 1, 2003, now U.S. Pat. No. 7,266,679, entitled "System And Method For Reducing Instability In An Information Handling System." The contents of this application is incorporated herein in its entirety by this reference.

TECHNICAL FIELD

The present invention relates in general to information handling systems, and more particularly to a system and method for reducing instability in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems include many types of components, such as memory units, processors and I/O ports. These individual components perform tasks such as storing, processing and transmitting data. A local bus may communicatively couple the components in the information handling system and may allow particular commands or messages to be sent between the components. Each component has a unique identifier and responds to a particular address range. By assigning a unique identifier to each of the components, the information handling system can effectively operate because instructions or messages are sent to the correct component.

After a boot operation is initiated in the information handling system, the identifier associated with one or more of the components may change. This identifier change may cause instability in the information handling system if more than one component is responding to messages or instructions sent to the same address range. If two or more components attempt to send or receive information to the same address, the performance of the system may degrade and may lead to a system hang that requires the user to reboot the system.

Previous solutions have focused on using components that dynamically update their associated identifiers. These components usually have the ability to monitor identifiers being used in the information handling system and automatically update their identifiers if a change in any of the identifiers is detected. However, this solution may actually cause instability in the information handling system if a component is present that cannot dynamically update its identifier.

Another solution for preventing two components from having the same identifier only applies during a boot operation. This solution utilizes expansion cards to override the problem of having two components with the same identifier. For example, during the boot operation, the processor uses a boot address to locate the component containing the basic input/output system (BIOS) instructions. If two components respond to the boot address, the system will hang. However, if the system is set up to boot from an expansion card, the system automatically accesses the expansion card and bypasses the two components with identical addresses. This solution, however, does not apply to information handling systems without expansion slots. Furthermore, expansion cards may only be used to solve identifier conflicts during the boot operation.

SUMMARY

Therefore, a need has arisen for a method and system for eliminating identifier conflicts in an information handling system.

A further need exists for a method and system for reducing instability in an information handling system during any operation performed by the system.

In accordance with the teachings of the present invention, disadvantages and problems associated with instability caused by devices having identical identifiers have been substantially reduced or eliminated. When a configuration change is detected in a first memory device, a device identifier is determined for a second memory device and updated in a configurable identification (CID) register associated with the second memory device, thereby preventing system instability.

More specifically, a method includes detecting a configuration change in a first memory device after the initiation of a boot operation. The method then determines a device identifier for a second memory device based on the configuration change. A configurable identification (CID) register associated with the second memory device is then updated with the device identifier.

In one embodiment, the configure change includes modifying a first identifier associated with the first memory device. A general purpose input associated with the second memory device may receive the modified first identifier. The device identifier for the second memory device is determined by reading the general purpose input to obtain the modified first identifier, comparing the modified first identifier to a second identifier stored in the CID register and selecting the device identifier if the modified first identifier matches the second identifier.

In another embodiment, an information handling system includes a local bus, a first flash device with a configurable identification (CID) register, a processing device, a sense engine and a management engine. The sense engine detects a configure change in the information handling system. The management engine determines a device identifier for the first flash device based on the configuration change and updates the CID register associated with the first flash device with the device identifier.

In a further embodiment, a general purpose input on the first flash device triggers a system management interrupt (SMI) event. The SMI event causes the management engine to enter into system management mode (SMM). While in SMM, the management engine reads the general purpose input to determine a modified device identifier, selects a new device identifier and updates the CID register with the new device identifier.

Important technical advantages of certain embodiments of the present invention include a management engine that reduces instability in an information handling system. Some information handling systems may include a device that does not have the ability to dynamically update information associated with the device if a configuration change occurs. The management engine receives notice that the configuration change occurred and determines if two or more devices have identical identifiers. The management engine identifies the device without the ability to dynamically update, determines a device identifier and updates a configurable identification register in the identified devices to ensure that two devices do not have the same identifier.

Another important technical advantage of certain embodiments of the present invention include a management engine that updates an identifier associated with a device located in an information handling system during any operation performed by the system. Systems that include expansion slots have the ability to resolve identifier conflicts during a boot operation by allowing the system to boot from an expansion cards. Identifier conflicts, however, may occur after the boot operation is completed. The management engine may receive notification of an identifier conflict during any operation performed by the system and automatically update an appropriate device with the correct identifier information.

All, some, or none of these technical advantages may be present in various embodiments of the present invention. Other technical advantages will be readily apparent to one skilled in the art from the following figures, descriptions, and claims.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to the figures, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
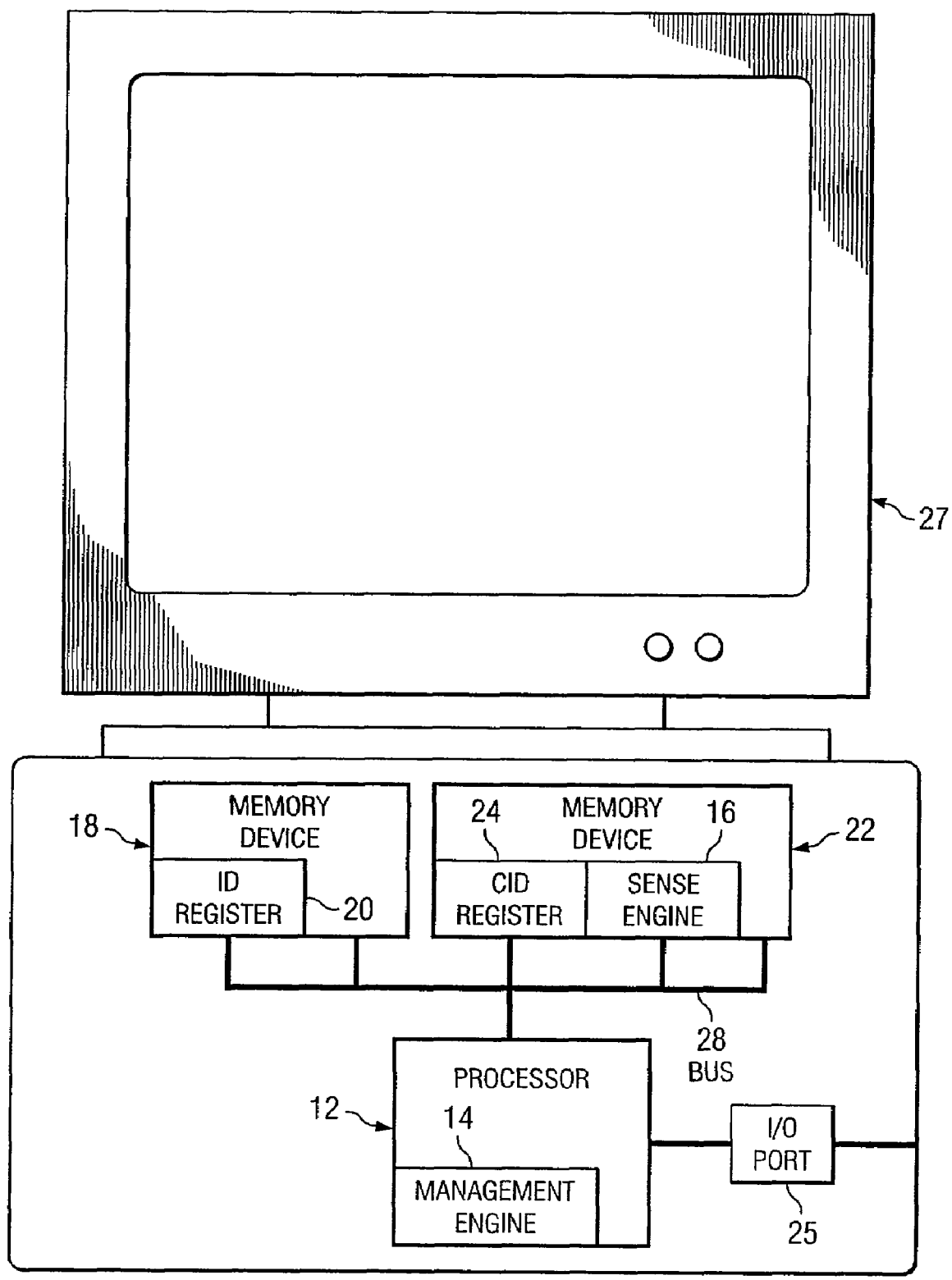
FIG. 1 illustrates a block diagram of an information handling system operable to eliminate device identifier conflicts in accordance with teachings of the present invention.

FIG. 1 illustrates a block diagram of information handling system 10. In the illustrated embodiment, information handling system 10 includes processor 12, management engine 14, sense engine 16, memory devices 18 and 22, local bus 28, input/output port 25 and display 27. In other embodiments, information handling system 10 may further include respective software components and hardware components, such as an operating system, storage drives, expansion slots, expansion cards and any other appropriate computer software and/or hardware. The various software and hardware components may also be referred to as processing resources. Local bus 28 may operate to electronically couple processor 12 to memory devices 18 and 22, input/output (I/O) port 25 and display 27. In one embodiment, local bus 28 is based upon an Intel® a Low Pin Count (LPC) Interface Specification Standard.

Processor 12 may be a central processing unit (CPU), a microprocessor, a digital signal processor or any other digital or analog circuitry configured to execute processing instructions stored in memory devices 18 and 22. Processor 12 may include management engine 14 that monitors memory devices 18 and 22 for configuration changes or receives notification of a configuration change in information handling system 10 and resolves any conflicts that may exist due to the configuration change. For example, management engine 14 operates to prevent two components, such as memory devices 18 and 22, from having the same device identifiers. In operation, management engine 14 reads identifiers associated with one or more components in information handling system 10, determines if one of the device identifiers has changed, selects a new device identifier for an appropriate component and updates the device identifier associated with that component.

In the illustrated embodiment, management engine 14 is located on processor 12. In other embodiments, management engine 14 may be included in memory devices 18 and/or 22 or in any other component forming information handling system 10. Although the illustrated embodiment depicts processor 12, other embodiments may include multiple and/or parallel processors.

Memory devices 18 and 22 may be programmable read-only memory (PROM), erasable programmable read-only memory (EPROM), electronically erasable programmable memory (EEPROM), a PCMCIA card, flash memory, or any suitable selection and/or array of volatile or non-volatile memory that retains data after the power to information handling system 10 is turned off. In another embodiment, memory devices 18 and 22 may be any volatile or non-volatile memory that includes firmware hub (FWH) functionality. A FWH device may store the basic input/output system (BIOS) code for information handling system 10.

Memory devices 18 and 22 may also be RAM, dynamic random access memory (DRAM), extended data out random access memory (EDO RAM), video random access memory (VRAM), static random access memory (SRAM), synchronous DRAM (SDRAM), ferroelectric random access memory (FRAM) single in-line memory modules (SIMM), dual in-line memory modules (DIMM), error correcting code (ECC) or any other suitable data storage medium. Memory devices 18 and 22 may be formed by a single component or may be separate components. Although FIG. 1 illustrates two memory devices, other embodiments allow for more than two memory devices.

Memory device 18 may include ID register 20. ID register 20 may store a device identifier for memory device 18 that defines the address range to which memory device 18 responds to or decodes. ID register 20 operates to allow multiple memory devices to be interfaced with local bus 28. ID register 20 may include one or more bits, also known as register fields, used to identify memory device 18 in information handling system 10. Each bit may have a value of zero or one and the combination of bits may be used by processor 12 to identify memory device 18 and the corresponding address range to which memory device 18 responds to.

In an embodiment where memory device 18 includes firmware hub (FWH) functionality, ID register 20 may have four bits that define sixteen separate address ranges. In one embodiment, memory device 18 may be a 4 megabyte (MB) device including eight 64 kilobytes (KB) blocks that represent eight different address ranges. In another embodiment, memory device may be a 8 MB device including sixteen 64 KB blocks that represent sixteen different address ranges. In other embodiments, information handling system 10 may include multiple memory devices that have ID registers for storing identifiers associated with each of the memory devices.

In one embodiment, memory device 18 includes the ability to dynamically update ID register 20. If a configuration change occurs in information handling system 10, memory device 18 may detect the change and update the device identifier in ID register 20 to avoid a device identifier conflict. Memory device 18 may perform these tasks internally without the help of an external updating system.

Memory device 22 may include configurable identification (CID) register 24 and sense engine 16. CID register 24 is similar to ID register 20 because CID register 24 stores a device identifier that represents a specific address range and allows information handling system 10 to identify memory device 22. CID register 24, however, differs from ID register 20 because memory device 22 does not have the ability to dynamically update the value stored in CID register 24 when a configuration change occurs in information handling system 10. In operation, CID register 24 may be updated by processor 12 in order to avoid a conflict from occurring in information handling system 10. Although only one memory device 18 is shown with CID register 24, other embodiments allow for multiple memory devices each including a CID register.

Memory device 22 may also include sense engine 16, which can detect a configuration change in information handling system 10 after initiation of a boot operation. Sense engine 16 may monitor either or both ID register 20 and CID register 24 to determine if the device identifiers respectively associated with memory devices 18 and 22 were altered during any operation performed by information handling system 10. Sense engine 16 detects a configuration change if at least one bit of either ID register 20 or CID register 24 changes state (e.g., switches from a zero to a one or a one to a zero). This change in state indicates that either or both memory devices 18 and 22 have been assigned a new device identifier.

In another embodiment, a configuration change may occur when another memory device is added to information handling system 10. The additional memory device may include either ID register 20 or CID register 24. When the additional memory device is added, information handling system 10 assigns a device identifier to the additional memory device, which could cause a conflict and trigger a configuration change.

In the illustrated embodiment, sense engine 16 is stored in memory device 22. However, in other embodiments, sense engine 16 may be stored in processor 12 or in another component within information handling system 10. In one embodiment, sense engine 16 is a general purpose input.

In one embodiment, after sense engine 16 detects a configuration change, management engine 14 reads ID register 20 to determine a modified device identifier for memory device 18. Based on this information, management engine 14 determines a new device identifier for memory device 22 and updates CID register 24 of memory device 22 with the new device identifier. Management engine 14, therefore, operates to externally manipulate the value of the device identifier stored in CID register 24 in order to avoid conflicts that may cause information handling system to become unstable and even hang.

In another embodiment, after a configuration change occurs, management engine 14 reads ID register 20 and CID register 24 and compares a device identifier stored in ID register 20 to a device identifier stored in CID register 24. If the device identifiers in ID register 20 and CID register 24 are identical, management engine 14 selects a new device identifier for CID register 24. By updating the device identifier in CID register 24, management engine 14 prevents memory devices 18 and 22 from having the same device identifier and, therefore, prevents memory devices 18 and 22 from responding to instructions and messages from the same address range.

Other embodiments allow for management engine 14 to monitor multiple ID registers and/or CID registers and determine a device identification and update the address of one or multiple CID registers.

Figure 2:
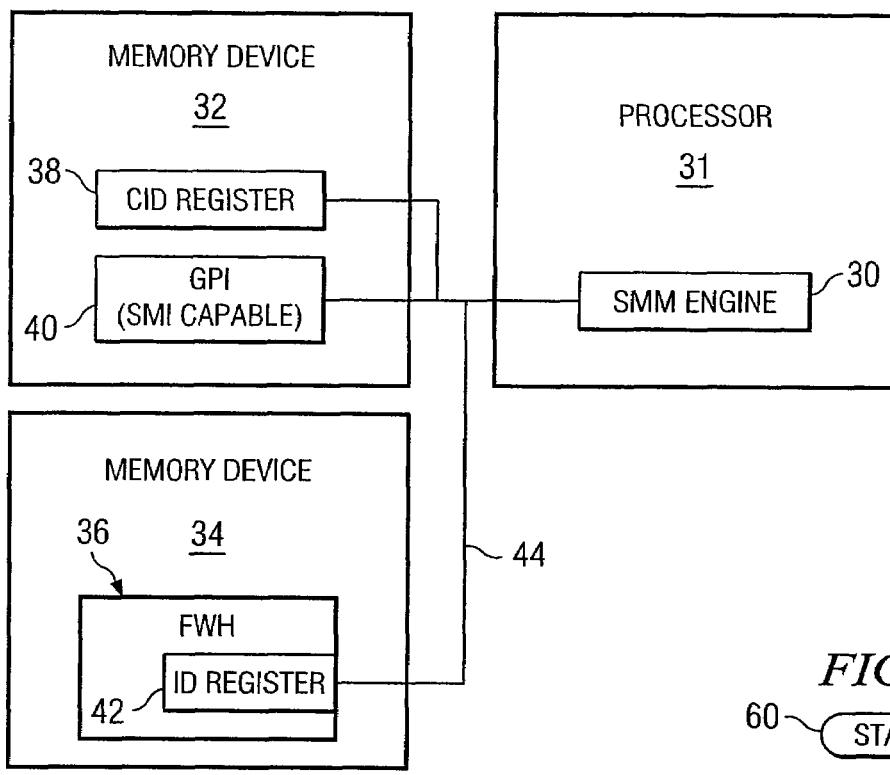
FIG. 2 illustrates a block diagram of a particular embodiment of components able to reduce instability in an information handling system.

FIG. 2 illustrates a block diagram of a particular embodiment of components able to reduce instability in information handling system 29. As illustrated, information handling system 29 includes processor 31, memory devices 32 and 34 and local bus 44.

Local bus 44 electrically couples processor 31 to memory devices 32 and 34. More particularly, local bus 44 associates SMM engine 30 with firmware hub (FWH) 36, CID register 38, general purpose input (GPI) 40 and ID register 42.

Memory devices 32 and 34 may be any volatile or non-volatile memory that retain data after the user turns off the power to information handling system 29. Memory devices 32 and 34 may respectively include the same characteristics as memory devices 22 and 18 in FIG. 1. In a particular embodiment, memory devices 32 and 34 may be flash memory devices.

In the illustrated embodiment, memory device 32 may include CID register 38 and general purpose input (GPI) 40. CID register 38 may have the same characteristics as CID register 24 in FIG. 1. CID register 38 may store a device identifier to uniquely identify memory device 32 in information handling system 29. The device identifier further represents an address range associated with memory device 32. CID register 38 may include one or more bits that can be externally updated with a new device identifier when a configuration change occurs in information handling system 29.

GPI 40 may be hardware and/or software that has the capability of detecting a configuration change in ID register

42. In another embodiment, GPI 40 may also monitor CID register 38 for a configuration change associated with memory device 32. GPI 40 may include one or more pins. Each GPI pin may monitor a change in one bit of ID register 42 in memory device 34. In one embodiment, four individual GPI pins each monitor four corresponding bits of ID register 42 in memory device 34.

In operation, GPI 40 triggers a system management interrupt (SMI) event if a configure change occurs in information handling system 29. The SMI event operates to alert processor 31 that a change has occurred in information handling system 29 that may require resolution. In one embodiment, GPI may generate an SMI event if the device identifier stored in ID register 42 and associated with memory device 34 is modified to have the same value as the device identifier stored in CID register 38 and associated with memory device 32.

Memory device 34 includes ID register 42 and firmware hub (FWH) 36. ID register 42 may have the same characteristics as ID register 20 in FIG. 1. ID register 42 stores a device identifier that uniquely identifies memory device 34 in information handling system 29. The device identifier further represents a valid address range for memory device 34. Unlike memory device 32, memory device 34 may have the ability to dynamically update the device identifier stored in ID register 42 when a configuration change occurs in information handling system 29. For example, when memory device 34 detects the configuration change, memory device 34 automatically determines a new device identifier and updates the device identifier stored in ID register 42 with the new device identifier.

In one embodiment, the ability to dynamically update the device identifier may be provided by FWH 36. FWH 36 may include a non-volatile RAM that stores the basic input/output system (BIOS) for information handling system 29. The BIOS serves as an intermediary between the operating software (not expressly shown) and hardware, such as memory devices 32 and 34. When a user turns on information handling system 29, processor 31 accesses the BIOS stored in memory device 34 to execute a boot operation. In the boot operation, the BIOS runs a POST routine. During the POST routine, the BIOS may ensure that all hardware components, such as memory devices 32 and 34, function properly. Once the POST routine is completed, the BIOS allow the operating system to begin executing.

As illustrated by FIG. 2, information handling system includes memory device 34 that contains FWH 36. In other embodiments, memory device 32 may also include FWH functionality. However, the FWH functionality in memory device 32 may not have the ability to dynamically update a device identifier stored in CID register 38.

Processor 31 may include system management mode (SMM) engine 30. SMM engine 30 may be hardware and/or software that uses an SMI event to determine the type of configuration change that occurred in information handling system 29. In one embodiment, SMM engine 30 may receive an SMI event from GPI 40. SMM engine 30 determines the configuration change from the SMI event and reads ID register 42 to determine if the device identifier associated with memory device 34 was modified. If the device identifier was modified, SMM engine 30 determines the modified device identifier stored in ID register 42, compares the modified identifier to a device identifier stored in CID register 38 and selects a new device identifier or memory device 32 if the modified identifier matches the device identifier stored in CID register 38.

In one embodiment, GPI 40 monitors the device identifier stored in ID register 42. If the device identifier is modified, GPI 40 triggers a SMI event by sending a signal to SMM engine 30. SMM engine 30 then reads the identifiers of ID register 42 and CID register 38. SMM engine 30 determines if a configuration change has occurred in information handling system 29 by comparing the device identifiers stored in CID register 36 and ID register 42. If the device identifiers are different, SMM engine 30 determines that no configuration change occurred and information handling system 29 resumes its normal operations. If the device identifiers are the same, SMM engine 30 determines that that a configuration change occurred. SMM engine 30 determines the modified device identifier stored in ID register 42 and selects a new device identifier for memory device 32 based on the modified device identifier. Then SMM engine 30 updates CID register 38 with the new device identifier. Once the device identifier for CID register 38 has been updated, SMM engine 30 returns information handling system 29 to normal operation and GPI 40 continues to monitor ID register 42 for any changes.

In another embodiment, a configuration change may occur if GPI 40 detects a change in state in at least one of the bits in ID register 42. GPI 40 sends a SMI event signal to SMM engine 30 in processor 31. SMM engine 30 may then use the SMI event signal to determine what type of configuration change occurred. In one embodiment, the SMI event signal may indicate the bit of ID register 42 that changed state. SMM engine 30 uses the information from the SMI event signal to determine a new device identifier for memory device 32 and updates CID register 36 with the new device identifier.

Figure 3:
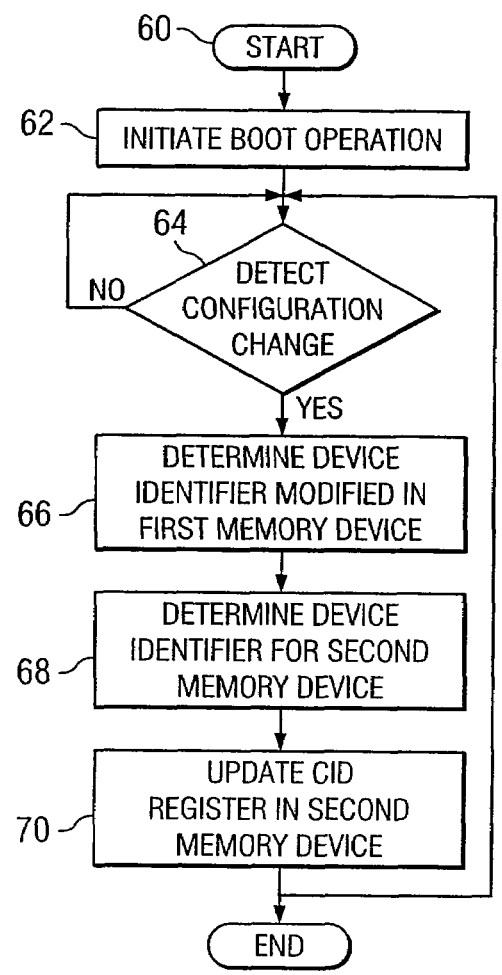
FIG. 3 illustrates a flow chart of a method for reducing instability in an information handling system in accordance with teachings of the present invention.

FIG. 3 illustrates a flow chart of a method for reducing instability in information handling system 10. The method starts at step 60 when a user turns on information handling system 10.

At step 62, information handling system 10 initiates a boot operation. The boot operation starts when an electrical signal follows a path to processor 12 and invokes the POST routine. The electrical signal may also clear any data left on memory devices 18 and 22. In one embodiment, the boot operation may be composed of the power-on self-test (POST) routine followed by the loading of the operating system. The POST routine is necessary to ensure that all the hardware components, including processor 12 and memory devices 18 and 22, are functioning properly. The POST routine ensures that information handling system 10 has the ability to carry out its tasks. This step is necessary before information handling system 10 loads the operating system. The operating system then allows information handling system 10 to interact with any software. Once the operating system loads, then the information handling system is ready for the user.

A cold boot operation may mean any boot in which the BIOS executes the POST routine. For example, a typical cold boot occurs when a user physically switches on an information handing system. Another example of a boot operation would be a warm boot. For example, if the user decides to restart the information handling system while using it, a warm boot operation would occur.

At step 64, processor 12 and/or sense engine 16 determines if a configuration change has occurred in information handling system 10. In one embodiment, processor 12 and/or sense engine 16 may continuously or intermittently monitor the individuals bits of ID register 20 and/or CID register 24 to determine if an event in information handling system 10 has modified the device identifier stored in either register. If any bit has changed state, processor 12 and/or sense engine 16 determines that a configuration change has occurred.

In another embodiment, sense engine 16 may be interfaced with one or more GPI pins such that the number of GPI pins corresponds to the number of bits in ID register 20. The GPI pins may be interfaced with the corresponding bits of ID register 20. If at least one of the GPI pins detects a change in the device identifier stored in ID register 20, sense engine 16 determines that a configuration change has occurred and may trigger an SMI event. Sense engine 16 may then communicate the SMI event to management engine 14 in processor 12 to indicate that a configuration change occurred. The SMI event may then initiate a system management mode in management engine 14.

If processor 12 and/or sense engine 16 do not detect a configuration change, processor 12 and/or sense engine 16 continue to monitor ID register 20 and/or CID register 24 at step 64. If processor 12 and/or sense engine 16 do detect a configuration change, management engine 16 determines the source of the configuration change at step 66. In one embodiment, the configuration change may be a modification of the device identifier associated with memory device 18 and stored in ID register 20. The modification may be detected directly by processor 12 or sense engine 16 may provide processor 12 with notification (e.g., an SMI event signal) that the modification occurred. If processor 12 detects the modification directly, management engine 12 may read ID register 20 to determine the modified device identifier. If sense engine 16 notifies management engine 14 that the modification occurred, management engine 14, while operating in SMM, may use the information provided in the SMI event signal to determine the modified device identifier.

At step 68, management engine 14 may use the modified device identifier associated with memory device 18 and stored in ID register 20 to determine a new device identifier for memory device 22. In one embodiment, management engine 14 may compare the modified device identifier from ID register 20 with the device identifier stored in CID register 24. If the modified device identifier matches the device identifier stored in CID register 24, management engine 14 selects a new device identifier for memory device 22.

For example, as illustrated in FIG. 1, information handling system 10 may include two memory devices: memory device 18 containing ID register 20 and memory device 22 containing CID register 24. Each register may store a four bit device identifier. Initially, memory device 18 may have the device identifier 0000 and memory device 22 may have the device identifier 0001. The modified device identifier may be 0001 such that the modified device identifier matches the device identifier stored in CID register 24. Management engine 14 may determine that the new device identifier for memory device 22 should be the original device identifier 0000 associated with memory device 18. In another embodiment, information handling system 10 may include three or more memory devices. Management engine 14 may then determine that the new device identifier for memory device 22 should be any appropriate device identifier that does not conflict with a device identifier associated with any other memory device in information handling system 10.

At step 70, management engine updates CID register 24 in memory device 22 with the new device identifier determined in step 70. In one embodiment, processor 12 uses the BIOS to update CID register 24. Because of the configurable nature of CID register 24, the BIOS can externally manipulate the individual bits of CID register 24 to create the desired device identifier. Once CID register 24 has been updated to include the new device identifier, processor 12 and/or sense engine 16 monitor ID register 20 and/or CID register 24 to determine if any more configuration changes occur while information handling system 10 is in operation.

Although the disclosed embodiments have been described in detail, it should be understood that various changes, substitutions and alterations can be made to the embodiments without departing from their spirit and scope.

What is claimed is:

1. A method for managing device identifiers in an information handling system, comprising:
    receiving a modified first device identifier for a first memory device, the first device identifier being modified after initiation of a boot operation, wherein the first device identifier for the first memory device is self-modified by the first memory device;
    comparing the modified first device identifier for the first memory device with a second device identifier for a second memory device, wherein the second memory device is not capable of self-modifying the second device identifier; and
    as a result of the comparison, modifying the second device identifier for the second memory device.

2. The method of claim 1, wherein:
    comparing the modified first device identifier with the second device identifier comprises determining that the modified first device identifier conflicts with the second device identifier; and
    modifying the second device identifier for the second memory device as a result of the comparison comprises modifying the second device identifier such that the second device identifier does not conflict with the first device identifier.

3. The method of claim 1, further comprising modifying an identification register in the second memory device with the modified second device identifier for the second memory device.

4. The method of claim 1, wherein the first and second memory devices comprise flash memory.

5. The method of claim 1, wherein the first device identifier for the first memory device is self-modified by the first memory device as a result of a configuration change affecting the first memory device.

6. A method for managing device identifiers in an information handling system including a first memory device capable of self-modifying a first device identifier for the first memory device and a second memory device not capable of self-modifying a second device identifier for the second memory device, comprising:
    receiving a self-modified first device identifier for the first memory device capable of self-modifying the first device identifier; and
    based on the self-modified first device identifier for the first memory device, modifying the second device identifier for the second memory device not capable of self-modifying the second device identifier.

7. The method of claim 6, wherein:
    the second device identifier for the second memory device is stored in the second memory device; and
    modifying the second device identifier for the second memory device not capable of self-modifying the second device identifier comprises a management engine external to the second memory device modifying the second device identifier stored in the second memory device.

8. The method of claim 6, wherein modifying the second device identifier for the second memory device based on the self-modified first device identifier for the first memory device comprises:
    determining that the second device identifier for the second memory device conflicts with the self-modified first device identifier for the first memory device; and modifying the second device identifier for the second memory device such that the second device identifier for the second memory device does not conflict with the modified first device identifier for the first memory device.

9. The method of claim 6, wherein the first device identifier for the first memory device is self-modified as a result of a configuration change affecting the first memory device.

10. An information handling system, comprising:
   a first memory device having a first device identifier;
   a second memory device having a second device identifier; and
   a management engine configured to:
      receiving a modified first device identifier for the first memory device, the first device identifier being modified after initiation of a boot operation for the information handling system, wherein the first device identifier for the first memory device is self-modified by the first memory device and the second memory device is not capable of self-modifying the second device identifier;
      comparing the modified first device identifier for the first memory device with the second device identifier for the second memory device; and
      as a result of the comparison, causing the second device identifier for the second memory device to be modified.

11. The information handling system of claim 10, wherein the management engine is configured to:
   determine, based on the comparison between the modified first device identifier and the second device identifier, that the modified first device identifier conflicts with the second device identifier; and
   cause the second device identifier for the second memory device to be modified such that the second device identifier does not conflict with the first device identifier.

12. The information handling system of claim 10, wherein the first device identifier for the first memory device is self-modified by the first memory device as a result of a configuration change associated with the information handling system.

13. The information handling system of claim 1, wherein the first and second memory devices comprise flash memory.

14. A method, comprising:
   detecting a configuration change associated with a first memory device of an information handling system, the configuration change occurring after initiation of a boot operation;
   identifying a change to at least one bit of a first device identifier for the first memory device, the change occurring as a result of the configuration change, wherein the first device identifier for the first memory device is self-modified by the first memory device as a result of the configuration change; and
   modifying a second device identifier for a second memory device based on the configuration change the modifying further based on the identified change to the at least one bit of the first device identifier for the first memory device, and wherein the second memory device is not capable of self-modifying the second device identifier for the second memory device.

15. The method of claim 14, further comprising:
   receiving an SMI event signal indicating the change to at least one bit of the first device identifier for the first memory device; and
   identifying the change to at least one bit of the first device identifier for the first memory device based on the received SMI event signal.

16. The method of claim 14, wherein modifying the second device identifier for a second memory device includes modifying an identification register in the second memory device with a modified second device identifier determined for the second memory device.

* * * * *